United States Patent [19]

Harvey et al.

[11] Patent Number: 5,502,161
[45] Date of Patent: Mar. 26, 1996

[54] METHOD FOR THE PRODUCTION OF FREE-FLOWING TETRAFLUOROETHYLENE POLYMER MOLDING POWDERS

[75] Inventors: Leonard W. Harvey, Downingtown, Pa.; Eric N. Martin, Greenville, Del.

[73] Assignee: ICI Americas Inc., Wilmington, Del.

[21] Appl. No.: 362,378

[22] Filed: Dec. 21, 1994

[51] Int. Cl.$^6$ ............................ C08K 5/06; C08K 5/053; B29C 67/00
[52] U.S. Cl. ..................... 528/494; 528/495; 528/503; 523/307; 523/309; 523/335; 524/545; 264/117
[58] Field of Search ........................... 523/335, 309, 523/307; 528/495, 494; 264/503, 117

[56] References Cited

U.S. PATENT DOCUMENTS

| | | | |
|---|---|---|---|
| 3,244,687 | 4/1966 | Spindler et al. | 528/494 |
| 3,597,405 | 8/1971 | Kometami et al. | 264/5 |
| 3,682,859 | 8/1972 | Taylor et al. | 523/220 |
| 3,767,751 | 10/1973 | Simmingskold et al. | 264/117 |
| 3,781,258 | 12/1973 | Kometani et al. | 528/494 |
| 3,882,217 | 5/1975 | Banham et al. | 264/117 |
| 3,983,200 | 9/1976 | Browning | 264/117 |
| 4,143,110 | 3/1979 | Morozumi et al. | 264/117 |
| 4,439,385 | 3/1984 | Kuhls et al. | 528/499 |
| 5,216,068 | 6/1993 | Zipplies | 523/335 |

FOREIGN PATENT DOCUMENTS

| | | |
|---|---|---|
| 1137349 | 10/1966 | United Kingdom . |
| 1173000 | 12/1966 | United Kingdom . |
| 1286686 | 12/1968 | United Kingdom . |

*Primary Examiner*—Paul R. Michl
*Assistant Examiner*—Andrew E. C. Merriam
*Attorney, Agent, or Firm*—John M. Sheehan

[57] ABSTRACT

An improved process for preparing free flowing tetrafluoroethylene (TFE) polymer powders is disclosed in which a TFE polymer powder is (1) wetted with an aqueous solution containing a wetting agent selected from the group consisting of (a) ethylene glycol ethers, (b) propylene glycol ethers and (c) diols or triols, (2) agglomerated and (3) dried.

12 Claims, No Drawings

METHOD FOR THE PRODUCTION OF FREE-FLOWING TETRAFLUOROETHYLENE POLYMER MOLDING POWDERS

BACKGROUND OF THE INVENTION

1. Field of the Invention

The present invention relates to an improved process for the preparation of products having improved flow properties, in particular to a process for the preparation of agglomerated tetrafluoroethylene (TFE) polymer molding powders.

2. Description of the Prior Art

Granular polymers of high molecular weight are generally manufactured by polymerization of tetrafluoroethylene, either alone or in the presence of a comonomer in an aqueous medium.

In order to improve the physical properties of articles made from such granular polymers, the polymer is disintegrated after polymerization. The best physical properties are obtained when the polymer has been disintegrated to a very small size—e.g., a polymer conforming to ASTM D4894 Type 2 specification.

However, such finely disintegrated polymer powders have very poor powder-flow properties and a low bulk density. These two disadvantages render the polymer unsuitable for use in automatic molding machines and so it is desirable to improve the bulk density and powder-flow properties.

The powder flow and bulk density of the finely disintegrated powders may be improved by subjecting the finely divided polymer powder to an agglomeration process. The aim of such a process is to cause the finely divided particles to adhere together to form agglomerates which exhibit good powder-flow properties and which also have a low compaction ratio but which can be broken down upon molding of the polymer powder so that the good mechanical properties obtained by the use of finely disintegrated material are retained.

Various methods have been proposed for effecting such agglomeration. One method of agglomeration is described in U.S. Pat. No. 3,597,405 in which the polymer powder is wetted with a minor amount of a liquid having a low surface tension and the wetted powder is formed into agglomerates by, for example, a tumbling operation. After formation of the agglomerates, the liquid is removed by heating. However, the liquids used in that process are generally volatile organic materials and the heating operation gives rise to flammability or toxicity problems. In addition it would be desirable to use cheaper liquids than these organic liquids.

U.S. Pat. No. 3,682,859 describes a similar process in which the tetrafluoroethylene polymer is wetted with an organic liquid.

U.S. Pat. No. 3,882,217 describes an agglomeration process in which the tetrafluoroethylene polymer product is wetted with a small amount of a solution of a volatile non-ionic surfactant in water prior to agglomeration. However, the surfactants decompose at the temperature used to dry the agglomerates and the decomposition products adversely affect the mechanical properties and color of products prepared from the agglomerates.

U.S. Pat. No. 3,983,200 describes a similar process in which tetrafluoroethylene polymer is first wetted with an aqueous solution containing a protective colloid.

SUMMARY OF THE INVENTION

The present invention relates to an agglomeration process in which the tetrafluoroethylene polymer is wetted with an aqueous solution containing either (a) an ethylene glycol ether, (b) a propylene glycol ether or (c) a diol or triol, followed by mechanical agitation to form the polymer into agglomerates and subsequent drying of the resulting agglomerates.

DESCRIPTION OF THE PREFERRED EMBODIMENTS

In accordance with the present invention an improved process for preparing agglomerates of a tetrafluoroethylene polymer comprises (a) wetting the tetrafluoroethylene polymer with an aqueous solution of a wetting agent (b) mechanically agitating the wetted composition to form it into agglomerates and (c) drying the agglomerates. Each of these steps is described in detail below.

The tetrafluoroethylene polymer which may be employed in the present invention is any polymer prepared by reacting tetrafluoroethylene, either alone or in the presence of a comonomer, to prepare a high molecular weight polymer. These polymers are well known in the art and include polytetrafluoroethylene granular polymers which are commercially available from ICI Americas Inc. as FLUON or from E. I. DuPont DeNemours & Company, Inc. as TEFLON. Copolymers, such as those referred to as FEP, a copolymer of perfluorinated propylene (HFP) and tetrafluoroethylene may also be employed. Various copolymers are described in detail in U.S. Pat. Nos. 2,955,099, 2,946,763 and 3,085,083.

If desired, any of many fillers can be combined with the tetrafluoroethylene polymer to produce filled compositions. Such fillers include glass fibers or beads, or bronze, graphite, molybdenum disulfide, coke flour, nickel powder, ceramics, cadmium oxide, various metallic oxides such as aluminum oxide and silica, silicates such as aluminum silicate and lithium aluminum silicate, metallic powders such as aluminum, iron, molybdenum or copper powders, potassium titanate, quartz, zircon, mica, or asbestos, or mixtures of the foregoing. One skilled in the art will choose the filler and its amount to lead to the desired physical properties in the end product.

In accordance with the present invention, the tetrafluoroethylene polymer and filler, if any, are blended together to form a dry powder. In order to employ an aqueous medium to wet the resulting tetrafluoroethylene powder, an appropriate wetting agent must be utilized. The wetting agent must satisfy a number of criteria. First, it must be soluble in water at low concentrations, generally on the order of less than 15 percent by weight based upon the total weight of the water and wetting agent and preferably less than 10% by weight based upon the total weight of the water and wetting agent. Most preferred results are achieved with an amount of wetting agent equal to from 1% to 5% based upon the total weight of the water and wetting agent. In addition, the boiling point of the wetting agent must be high enough so that it is not highly volatile at room temperature yet it must be capable of being removed from the resulting agglomerates at temperatures below about 500° F., without the formation of decomposition products that adversely affect the properties or color of the finished product.

In accordance with the present invention it has been found that only certain materials satisfy these criteria and may be used in carrying out the present invention. Thus, the present invention utilizes an aqueous solution containing a wetting agent selected from the group consisting of (a) ethylene glycol ethers, having the following general formula $C_nH_aO(C_2H_4O)_xH$ wherein n is an integer equal to from 3 to 8, a is an integer equal to 2n+1, 2n−1 or 2n−3, and x is an integer equal to from 1 to 3 provided that when n equals 3, a is either 2n+1 or 2n−1, and when n equals 7 or 8, x is 2 or 3

(b) propylene glycol ethers having the following general formula $C_nH_aO(C_3H_6O)_xH$ wherein n is an integer equal to 3 or 4 a is an integer equal to 2n+1, 2n−1 or 2n−3, and x is an integer equal to 1 or 2 provided that when n equals 3, a is either 2n+1 or 2n−1, and (c) diols or triols having the following general formula $R—(OH)_x$ wherein R is a linear or branched chain, saturated or unsaturated hydrocarbon radical containing from 6 to 12 carbon atoms, and X is an integer equal to 2 or 3. Preferred ethylene glycol ethers which may be used are ethylene glycol monobutyl ether, diethylene glycol monobutyl ether, and diethylene glycol monohexyl ether. Preferred propylene glycol ethers are propylene glycol monopropyl ether, propylene glycol monobutyl ether and dipropylene glycol monobutyl ether. Preferred diols or triols are (a) 1,2 alkane diols such as 1,2 hexane diol; 1,2 heptanediol, and 1,2 octane diol, (b) 1,2,3 alkane triols such as 1,2,3 decane triol and (c) alkynl diols such as 3,6 dimethyl -4-octyne -3,6 diol. Of these, preferred results are achieved with the propylene glycol ethers. Of the ethers especially preferred results are achieved with dipropylene glycol monobutyl ether.

In the present invention, the wetting agent is first dissolved in water. The amount of aqueous solution employed is not narrowly critical to the present invention and may be varied depending upon the density/pellett integrity desired in the final product. Also, the amount of aqueous solution depends upon the amount of filler in the composition. In general, compositions containing more filler require less of the aqueous solution to achieve the same density.

The tetrafluoroethylene polymer is wetted with the aqueous solution. This may be accomplished by any means conventional in this art. Suitable methods include stirring the powder and the liquid together and spraying the liquid onto the dry blend.

After the tetrafluoroethylene polymer is wetted, the wetted powder is agglomerated utilizing known equipment. Suitable agglomerating apparatus and methods include double cone blenders, inclined pans or disks or rotating tubes. Typical equipment which may be utilized is described in U.S. Pat. No. 3,597,405 and U.S. Pat. No. 5,182,119.

After agglomeration, the resulting agglomerated material is dried, again utilizing conventional equipment to produce the free-flow products of the present invention. Temperatures up to 560°–620° F. for times of from 4 to 12 hours are conventionally employed.

In order to describe the present invention so that it may be more clearly understood, the following examples are set forth. These examples are set forth primarily for the purpose of illustration and any specific enumeration of detail contained therein should not be interpreted as a limitation on the concept of this invention.

In the examples, the following materials and test procedures were used.

Slit flow is measured by a slit flow test, known in this art. The agglomerated product is placed into a triangular hopper apparatus. When the hopper apparatus is actuated, one side of the hopper gradually moves (as in the manner of a sliding gate) thus defining a slit in the bottom of the hopper. This opening increases in size until about 50 grams of pellets have fallen through and into a pan. The same weight of pellets, which exhibit better flowability will fall through a smaller slit opening. The slit width is used as an indicator of how well the pellet material will fill mold cavities at plastic article fabricators.

Bulk density was measured by ASTM D4745.

Tensile strength was measured by ASTM D4745.

Tensile elongation was measured by ASTM D4745.

PTFE refers to tetrafluoroethylene polymer available from ICI Americas Inc. as FLUON G580.

Glass fiber refers to type E glass of nominal 14 micron diameter by 60 micron length.

Pigment refers to green chromium oxide pigment.

Coke refers to coke flour having an average particle size less than 100 microns.

Homoloid mill refers to a Fitz mill Homoloid Model, available from the Fitzpatrick Company.

Dravo refers to a horizontally rotating pan pelletizer model 016-2 available from Ferro-Tech, Inc..

EXAMPLE 1

Into a suitable container there was added 532.8 g of PTFE, 180.0 g of glass fiber and 7.2 g of pigment. The resulting dry blend was processed four times through a Homoloid mill fitted with a 0.040 inch screen.

In a separate container, there was combined 267.4 g of demineralized water and 12.6 g of dipropylene glycol monobutyl ether.

The liquid ether/water mixture was poured into the container of the dry blend and the wet compound was stirred with a spatula for approximately two minutes to uniformly wet the dry blend. The resulting wet blend was processed one time through a Homoloid mill fitted with a 0.040 inch screen.

The wet milled product was placed on a Dravo pan pelletizer operating at an angle of 30° and a speed of 25 RPM for three minutes. At the end of this time the pellets are dropped onto a 9 in ×15 in tray and baked in an oven at 570° F. for four hours. The resulting product had the following properties Slit flow 3.5 mm Bulk density 803.8 g/l Tensile strength 2151 psi Tensile Elongation 212%

EXAMPLE 2–3

Utilizing the same procedures as in Example 1, other wetting agents were evaluated and the following results were obtained.

| Example | Wetting Agent |
|---------|---------------|
| 2       | ethylene glycol monobutyl ether |

-continued

| Example | Wetting Agent |
|---------|---------------|
| 3 | diethylene glycol monohexyl ether |

In Example 2 the dry ingredients used were 560 g of PTFE, 70 g of glass fiber and 70 g of coke. The aqueous solution contained 270 g of demineralized water and 30 g of ethylene glycol monobutyl ether.

In Example 3, the dry ingredients used were 573.5 g of PTFE and 201.5 g of glass fiber. The aqueous solution contained 220.5 g of demineralized water and 4.5 g diethylene glycol monohexyl ether.

RESULTS

| Ex. | Slit Flow (Width) | Bulk Density (g/l) | Tensile Strength (psi) | Tensile Elongation (%) |
|-----|-------------------|--------------------|-----------------------|------------------------|
| 2 | 4.7 | 744.5 | Not Measured | Not Measured |
| 3 | 4.3 | 848.0 | 2234 | 195 |

What is claimed is:

1. A process for preparing an agglomerated tetrafluoroethylene polymer, said process comprising:

(A) wetting a tetrafluoroethylene polymer with an aqueous solution containing a wetting agent selected from the group consisting of (a) ethylene glycol ethers, having the following general formula $$C_nH_aO\,(C_2H_4O)_xH$$

wherein n is an integer equal to from 3 to 8, a is an integer equal to 2n+1, 2n−1 or 2n−3, and x is an integer equal to from 1 to 3 provided that when n equals 3, a is either 2n+1 or 2n−1, and when n equals 7 or 8, x is 2 or 3

(b) propylene glycol ethers having the following general formula $$C_nH_aO\,(C_3H_6O)_xH$$

wherein n is an integer equal to 3 or 4 a is an integer equal to 2n+1, 2n−1 or 2n−3, and x is an integer equal to 1 or 2 provided that when n equals 3, a is either 2n+1 or 2n−1 and (c) diols or triois having the following general formula $$R—(OH)_x$$

wherein

R is a linear or branched chain, saturated or unsaturated hydrocarbon radical containing from 6 to 12 carbon atoms, and X is an integer equal to 2 or 3.

(B) mechanically agitating the wetted composition to form it into agglomerates and (C) drying the agglomerates.

2. A process, as claimed in claim 1, wherein the tetrafluoroethylene polymer is polytetrafluoroethylene.

3. A process, as claimed in claim 1, wherein the aqueous solution contains a propylene glycol ether.

4. A process, as claimed in claim 3, wherein the ether is dipropylene glycol monobutyl ether.

5. A process, as claimed in claim 1, wherein the aqueous solution contains a diol.

6. A process, as claimed in claim 5, wherein the alkane diol is 1,2 octane diol.

7. A process, as claimed in claim 1, wherein the amount of wetting agent in the aqueous solution is equal to less than 15% by weight based upon the total weight of the solution.

8. A process, as claimed in claim 7, wherein the amount is equal to less than 10%.

9. A process, as claimed in claim 8, wherein the amount is equal to from 1% to 5%.

10. A process, as claimed in claim 1, wherein the agglomerates are dried at up to 560° to 620° F. for from 4 to 12 hours.

11. A process, as claimed in claim 1, wherein the aqueous solution contains an ethylene glycol ether.

12. A process, as claimed in claim 11, wherein the ether is diethylene glycol monohexyl ether.

* * * * *